(12) United States Patent
Nagai et al.

(10) Patent No.: US 12,461,237 B2
(45) Date of Patent: Nov. 4, 2025

(54) LIGHT RANGE FINDING APPARATUS

(71) Applicant: DENSO CORPORATION, Kariya (JP)

(72) Inventors: Toshiaki Nagai, Kariya (JP); Sakito Miki, Kariya (JP)

(73) Assignee: DENSO CORPORATION, Kariya (JP)

( * ) Notice: Subject to any disclaimer, the term of this patent is extended or adjusted under 35 U.S.C. 154(b) by 1120 days.

(21) Appl. No.: 17/401,012

(22) Filed: Aug. 12, 2021

(65) Prior Publication Data

US 2021/0373155 A1 Dec. 2, 2021

Related U.S. Application Data

(63) Continuation of application No. PCT/JP2020/003952, filed on Feb. 3, 2020.

(30) Foreign Application Priority Data

Feb. 14, 2019 (JP) ................. 2019-024225

(51) Int. Cl.
*G01S 17/08* (2006.01)
*G01C 3/06* (2006.01)
*G01S 7/484* (2006.01)
*G01S 7/4861* (2020.01)
*G01S 17/931* (2020.01)

(52) U.S. Cl.
CPC ............... *G01S 17/08* (2013.01); *G01C 3/06* (2013.01); *G01S 7/484* (2013.01); *G01S 7/4861* (2013.01); *G01S 17/931* (2020.01)

(58) Field of Classification Search
CPC ...... G01S 7/4861; G01S 7/484; G01S 7/4814; G01S 7/4816; G01S 17/08; G01S 17/931; G01S 17/894; G01C 3/08; G01C 3/06
See application file for complete search history.

(56) References Cited

U.S. PATENT DOCUMENTS

| | | |
|---|---|---|
| 2004/0012770 A1 | 1/2004 | Stierle et al. |
| 2004/0114921 A1 | 6/2004 | Braun et al. |
| 2007/0181810 A1 | 8/2007 | Tan et al. |

(Continued)

FOREIGN PATENT DOCUMENTS

| | | |
|---|---|---|
| JP | 2010-091377 A | 4/2010 |
| JP | 2010-271306 A | 12/2010 |

(Continued)

*Primary Examiner* — Sang H Nguyen
(74) *Attorney, Agent, or Firm* — Maschoff Brennan

(57) ABSTRACT

A light range finding apparatus is provided with a light emitting optical system that projects a pattern light having an irradiation region and a non-irradiation region; a light receiving sensor including an arrayed light receiving element; a light receiving optical system that receives a reflected light of the pattern light and enlarges a portion of the reflected light corresponding to the irradiation region to be larger than a single light receiving element and causes the enlarged reflected light to be incident on the light receiving sensor; a distance measurement unit that measures a distance to the object based on an output of the light receiving sensor; and a positional alignment section that performs, based on the output of the light receiving sensor, a positional alignment of at least a part of the light emitting optical system and the light receiving optical system.

8 Claims, 13 Drawing Sheets

(56) References Cited

U.S. PATENT DOCUMENTS

| | | | | |
|---|---|---|---|---|
| 2012/0133954 A1* | 5/2012 | Takabayashi | ...... | G01B 11/2536 |
| | | | | 356/610 |
| 2012/0261474 A1* | 10/2012 | Kawashime | ......... | G02B 26/005 |
| | | | | 235/462.24 |
| 2012/0327223 A1* | 12/2012 | Iwatsuki | ................. | G01V 8/12 |
| | | | | 348/135 |
| 2014/0078490 A1* | 3/2014 | Higo | ...................... | G01B 11/25 |
| | | | | 356/4.01 |
| 2014/0169635 A1* | 6/2014 | Nishimura | .............. | G06T 7/521 |
| | | | | 382/106 |
| 2015/0002662 A1* | 1/2015 | Furihata | ................. | H04N 23/74 |
| | | | | 348/136 |
| 2015/0276383 A1* | 10/2015 | Yoshikawa | ............. | G01S 17/89 |
| | | | | 348/136 |
| 2017/0227643 A1 | 8/2017 | Nagai | | |
| 2017/0318231 A1* | 11/2017 | Matsuno | ................ | H04N 23/69 |
| 2017/0363740 A1* | 12/2017 | Kubota | ................... | G01S 7/484 |
| 2018/0131450 A1* | 5/2018 | Kare | ....................... | H01S 5/005 |
| 2018/0167602 A1 | 6/2018 | Pacala et al. | | |
| 2018/0188020 A1* | 7/2018 | Fuchikami | ........... | H04N 17/002 |

FOREIGN PATENT DOCUMENTS

| | | |
|---|---|---|
| JP | 2014-153343 A | 8/2014 |
| JP | 2016-166814 A | 9/2016 |
| JP | 2018-091760 A | 6/2018 |

\* cited by examiner

LIGHT RANGE FINDING APPARATUS

CROSS-REFERENCE TO RELATED APPLICATION

This application is the U.S. bypass application of International Application No. PCT/JP2020/3952 filed Feb. 3, 2020, which designated the U.S. and claims priority to Japanese Patent Application No. 2019-024225 filed on Feb. 14, 2019, the contents of which are incorporated herein by reference.

BACKGROUND

Technical Field

The present disclosure relates to a light range finding apparatus.

Description of the Related Art

A light range finding apparatus is known. For example, a light range finding apparatus is configured to irradiate into a space a projection pattern having a plurality of irradiation regions and non-irradiation regions which occupy the spaces between the irradiation regions, and receives reflected light from an object, thereby measuring the distance to the object.

SUMMARY

The present disclosure can be accomplished in the following manners. According to one aspect of the present disclosure, a light range finding apparatus is provided. The light range finding apparatus is provided with a light emitting optical system that projects a pattern light having an irradiation region and a non-irradiation region; a light receiving sensor including an arrayed light receiving element; a light receiving optical system that receives a reflected light of the pattern light and enlarges a portion of the reflected light corresponding to the irradiation region to be larger than a single light receiving element and causes the enlarged reflected light to be incident on the light receiving sensor; a distance measurement unit that measures a distance to the object based on an output of the light receiving sensor; and a positional alignment section that performs, based on the output of the light receiving sensor, a positional alignment of at least a part of the light emitting optical system and the light receiving optical system.

BRIEF DESCRIPTION OF THE DRAWINGS

The foregoing and other objects, features, and advantages of the present disclosure will be more clarified by the following detailed descriptions with reference to the accompanying drawings.

In the accompanying drawings.

DETAILED DESCRIPTION OF THE PREFERRED EMBODIMENTS

For a light range finding apparatus, JP-A-2016-166814 discloses an apparatus that irradiates into a space a projection pattern having a plurality of irradiation regions and non-irradiation regions which occupy the spaces between the irradiation regions, and receives reflected light from an object, thereby measuring the distance to the object. Moreover, US20180167602A1 discloses an apparatus in which a light shielding plate having holes at portions corresponding to respective light receiving elements is disposed to shield light transmitted from the non-irradiation region, and a diffuser expands the reflected light such that respective light receiving elements effectively receive light, thereby imaging using the light receiving elements. Furthermore, a similar technique disclosed by JP-A-2007-214564 relates to the present disclosure.

According to an optical system in such an apparatus, positional alignment of the light receiving position of light with respect to the light receiving sensor significantly influences the accuracy of the distance measurement. However, even when the positional alignment is performed accurately before product shipping, due to aging or temperature variation, the light receiving position may vary. In this respect, a technique capable of performing accurate range finding is required even in the case where the light range finding apparatus has been operated for a long term period or operated outdoors.

With reference to drawings, hereinafter, embodiments of the present disclosure will be described.

A. First Embodiment

Figure 1:
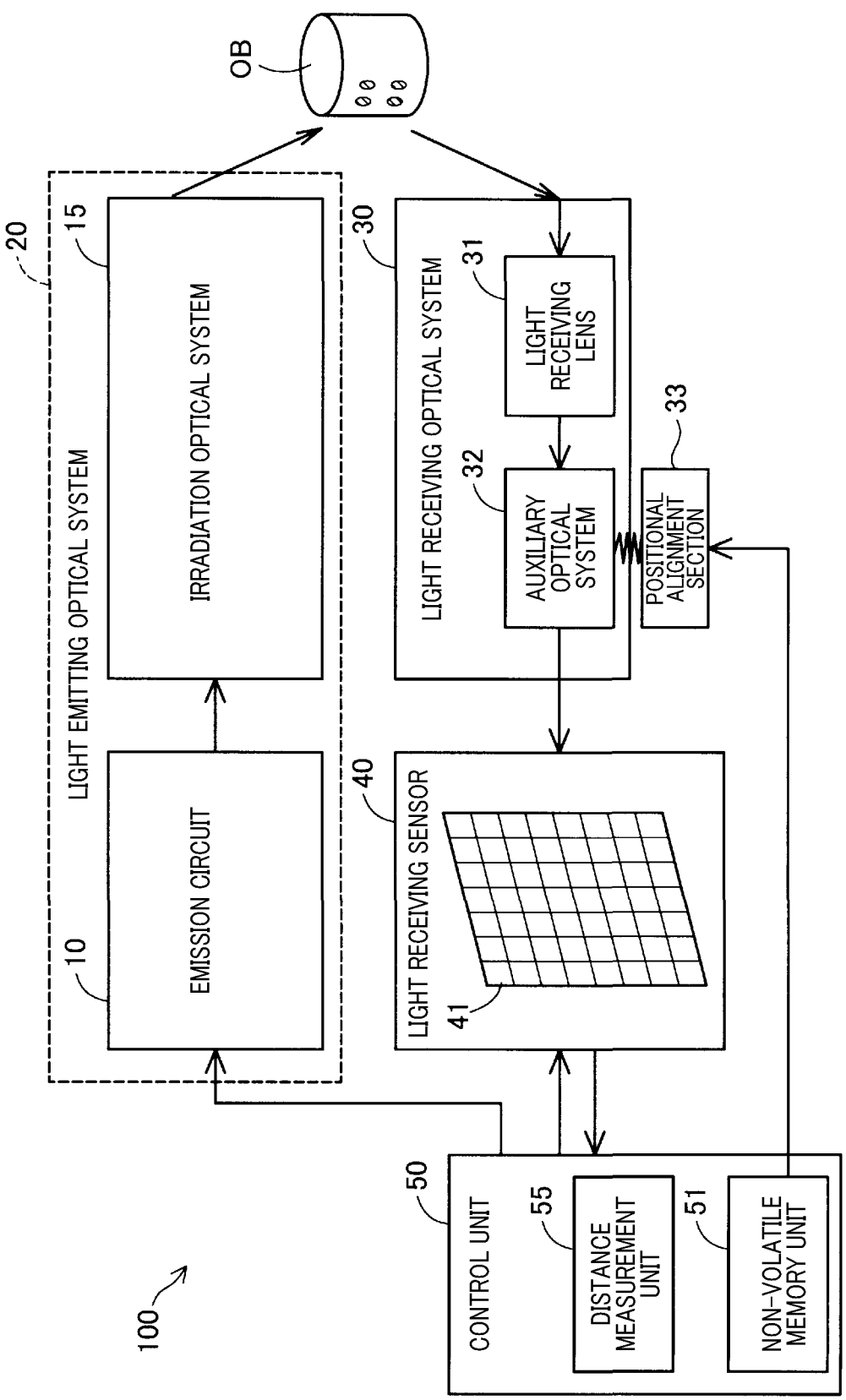
FIG. 1 is a block diagram showing an overall configuration of a light range finding apparatus according to a first embodiment of the present disclosure.

As shown in FIG. 1, a light range finding apparatus 100 according to a first embodiment of the present disclosure is provided with a light emitting optical system 20, a light receiving optical system 30, a positional alignment section 33, a light receiving sensor 40 and a control unit 50. The light range finding apparatus 100 is mounted on, for example, a vehicle and used for distance measurement that measures distances to other vehicles or an obstacle.

Figure 2:
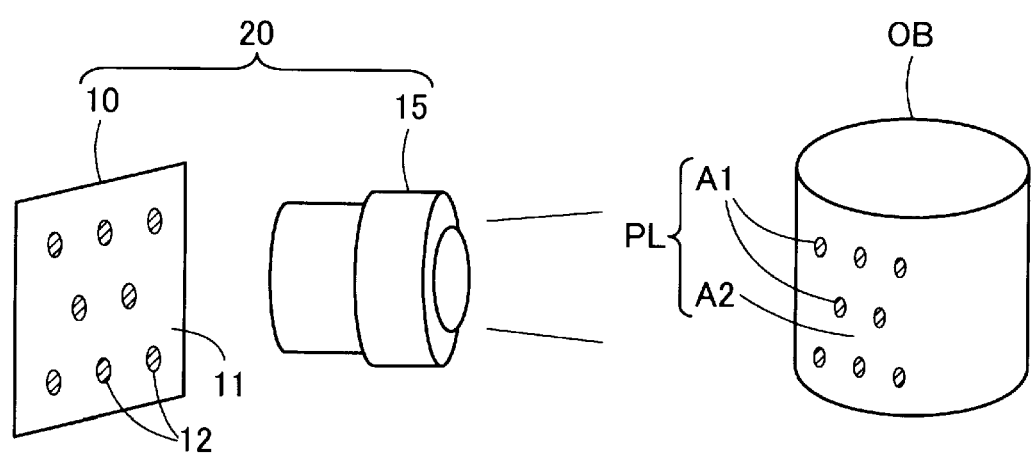
FIG. 2 is a diagram showing an overall configuration of a light emitting optical system.

As shown in FIGS. 1 and 2, the light emitting optical system 20 includes a light emission circuit 10 and an irradiation optical system 15. The light emission circuit 10 is configured of a plurality of light sources 12 mounted on a substrate 11. The substrate 11 includes a drive circuit 11 mounted thereon for driving the respective light sources 12. Each light source 12 is a semiconductor laser diode. The respective light sources 12 simultaneously irradiate pulse laser light at a predetermined period with a synchronized timing. The irradiation optical system 15 is configured of an assembled lens for example, and projects the irradiation light irradiated from the light emission circuit on the object OB. With such a light emitting optical system 20, according to the present embodiment, as shown in FIG. 2, a pattern light PL having a plurality of spotlights is projected on the object OB. The pattern light PL has a plurality of irradiation regions A1 formed by emission of the respective light sources 12, and non-irradiation regions A2 which occupy the space between these irradiation regions A1.

Figure 3:
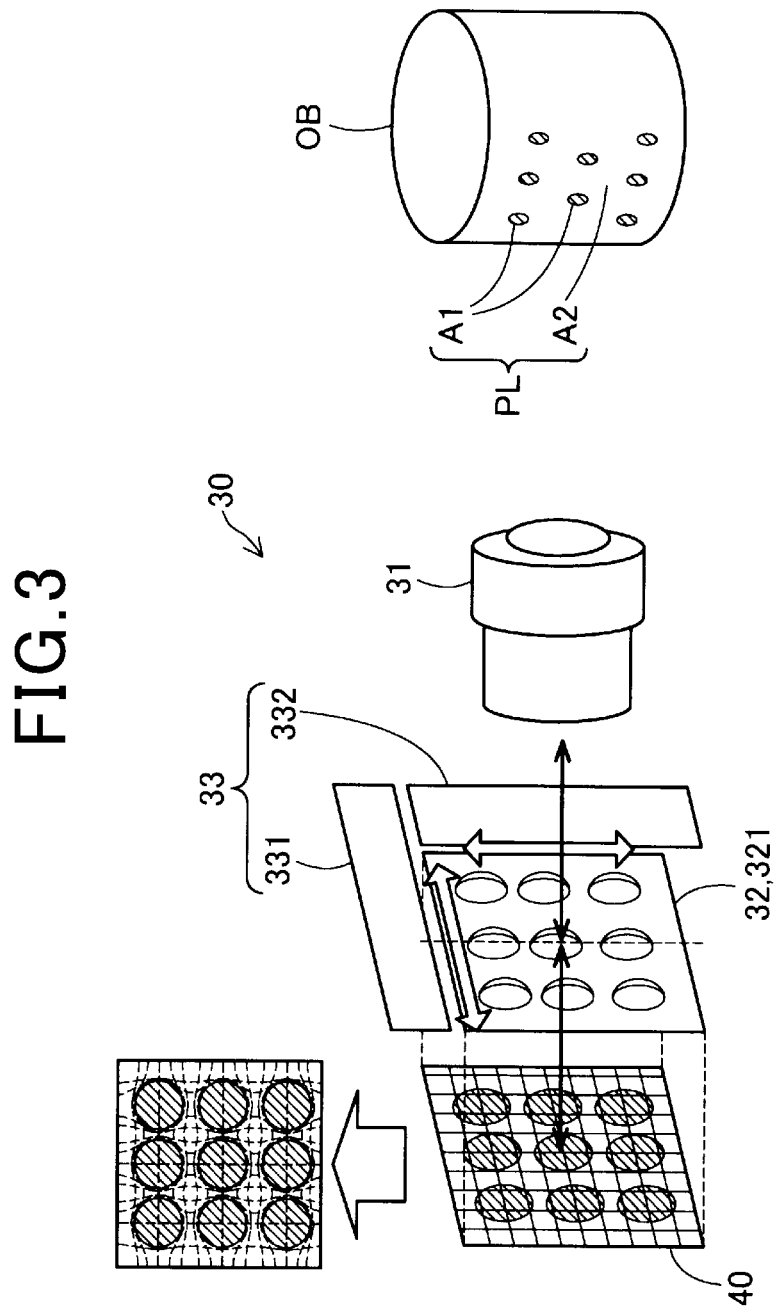
FIG. 3 is a diagram showing an overall configuration of a light receiving optical system.

As shown in FIGS. 1 and 3, the light receiving optical system 30 is provided with a light receiving lens 31 and an auxiliary optical system 32. The light receiving lens 31 is configured of, for example, an assembled lens. The reflected light of the pattern light PL reflected at the object OB is transmitted through the light receiving lens 31 and the auxiliary optical system 32 and is incident on the light receiving sensor 40. According to the present embodiment, the auxiliary optical system 32 is provided with a scaling lens 321 which enlarges a portion corresponding to the irradiation region A1 in the reflected light and reduces a portion corresponding to the non-irradiation region A2 in the reflected light. With this scaling lens 321, the image to be formed on the light receiving lens 40 is distorted and the light corresponding to the irradiation region A1 in the reflected light is enlarged to be larger than a single light receiving element 41 (pixel) of the light receiving sensor 40 which will be described later. Note that an arrangement of the light receiving lens 31 and the light receiving sensor 40 corresponds to an arrangement in which the position of the light receiving sensor 30 is at the focusing position of the light receiving lens 31 in the case where the auxiliary optical system is not provided. The positional alignment section 33 includes a function that moves the auxiliary optical system 32 in the parallel direction. The parallel direction refers to a direction orthogonal to the direction of light proceeding to the light receiving sensor 40 from the light receiving lens 31. According to the present embodiment, the positional alignment section 33 includes a horizontally moving actuator 331 which moves the auxiliary optical system 32 in the horizontal direction and a vertically moving actuator 332 which moves the auxiliary optical system 32 in the vertical direction. The operations of these actuators are controlled by the control unit 50.

As shown in FIG. 1, the light receiving sensor 40 includes an arrayed light receiving element 41. According to the present embodiment, the light receiving element 41 includes a plurality of SPADs (i.e. single photon avalanche diode) and is referred to as a pixel. The light receiving sensor 40 is configured as a silicon photo multiplier having a plurality of pixels. For example, a single pixel is constituted of total 24 pcs of SPADs (horizontally 6 pcs×vertically 4 pcs). Each SPAD operates in Geiger mode and outputs pulse signals with a certain probability when receiving light (photon). Hence, each pixel outputs 0 to 24 pulse signals depending on the intensity of the light. The light receiving sensor 40 includes an adder circuit per pixel for accumulating pulse signals, and outputs 0 to 24 values to the control unit 50. The control unit 50 has a function that controls the light emission circuit 10 and the positional alignment section 33. Also, the control unit 50 is provided with a distance measurement unit 55 as a functional unit that measures a distance to the object OB based on the output of the light receiving sensor 40. According to the present embodiment, the control unit 50 is configured as a computer including a CPU and a memory unit and accomplishes various functions by executing programs stored in the memory unit. Note that all or part of functions of the control unit 40 may be accomplished by hardware circuits.

Figure 4:
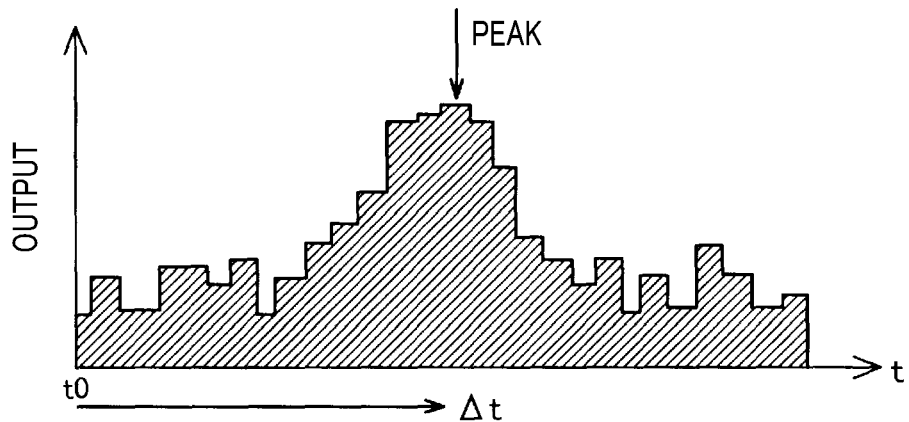
FIG. 4 is an example of a histogram.

The distance measurement unit 55 acquires output values 0 to 24 from the respective pixels in the light receiving sensor 40, and stores the acquired values to corresponding bins based on the light travelling time (TOF: time of flight), thereby producing the histogram shown in FIG. 4. Then, a peak position in the histogram is detected, and distance measurement is performed for each pixel in accordance with the following equation (1) based on the TOF corresponding to the peak position.

$$D=(c \cdot \Delta t)2 \qquad (1)$$

where $\Delta t$ refers to time of flight TOF, c is the speed of light, D is a distance to the object.

Figure 5:
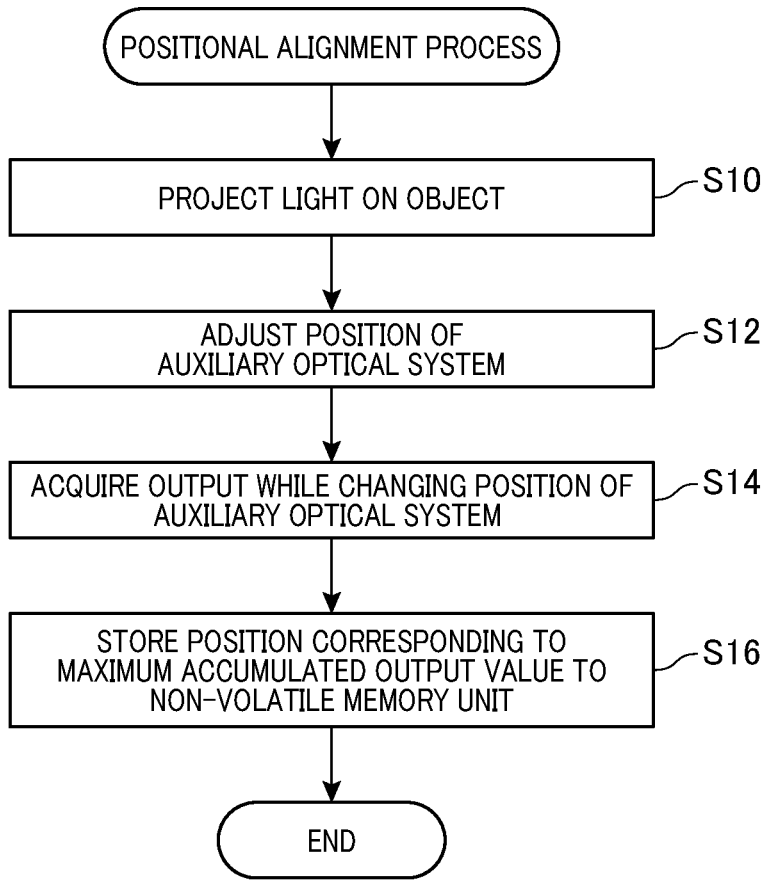
FIG. 5 is a flowchart showing a positional alignment process.

FIG. 5 shows a processing content of a positional alignment process for performing a positional alignment of the auxiliary optical system 32. The positional alignment process is executed, for example, when shipping the light range finding apparatus 100, inspecting the vehicle on which the light range finding apparatus 100 is mounted, stopping the vehicle or at a timing required by the user. In the positional alignment process, firstly, at step S10, the control unit 50 controls the light emission circuit 10 to project the pattern light PL to the object OB. The object OB to which the pattern light PL is projected is, for example, an inspection target in which the shape and the reflection factor are determined in advance. The control unit 50 controls the positional alignment section 33 to start aligning the position of the auxiliary optical system 32, and acquires the output of the light receiving sensor 40 for each pixel while changing the position of the auxiliary optical system 32. Then, the control unit 50 stores, at step S16, the position of the auxiliary optical system 32 corresponding to the maximum accumulated value of the output acquired from the respective pixels to a non-volatile memory unit 51. According to the present embodiment, the control unit 50 controls the positional alignment section 33 to perform the positional alignment of the auxiliary optical system 32 such that the output of the light receiving sensor 40 becomes the maximum. Note that the object OB to which the pattern light PL is projected, is not limited to the inspection target but may be any object. For example, in the case where the pattern light PL is projected on an object which is a usual detection object such as a road surface, the positional alignment of the auxiliary optical system 32 can be performed in an actual operation state.

The control unit 50 reads the position of the auxiliary optical system 32 stored in the non-volatile memory unit 51 when activating the light range finding apparatus 100, controls the positional alignment section 33 to align the position of the auxiliary optical system 32 such that the auxiliary optical system 32 is located at the position read from the non-volatile memory unit 51.

Figure 6:
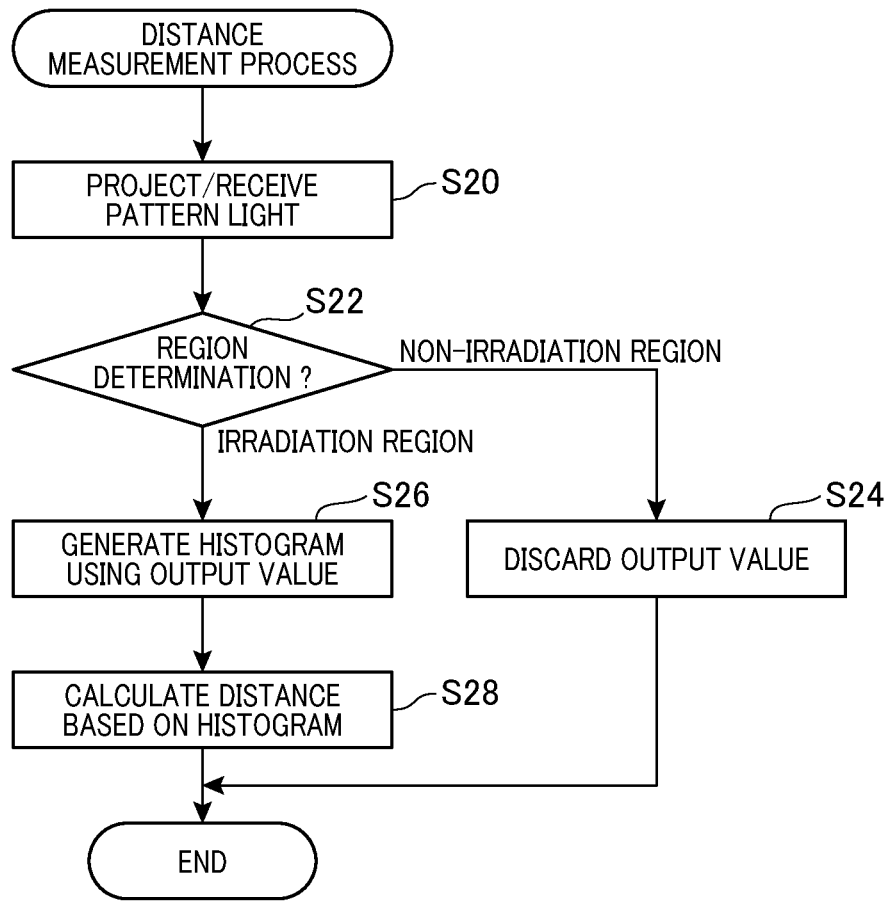
FIG. 6 is a flowchart showing a distance measurement process.

FIG. 6 shows contents of the distance measurement process which are repeatedly executed by the control unit 50 during an activation of the light range finding process 100. At step S20, the control unit 50 controls the light emission circuit 10 to project the pattern light PL and receives the reflected light using the light receiving sensor 40. At step S22, the distance measurement unit 55 determines, for respective outputs acquired from the light receiving sensor 40 for each pixel, whether corresponding pixel belongs to the irradiation region or non-irradiation region. The relationship between respective pixels and, the irradiation region and the non-irradiation region is stored in advance in the memory unit of the control unit 50. The distance measurement unit 55 discards, at step S24, output values acquired from the pixels corresponding to the non-irradiation region. The distance measurement unit 55 generates, at step S26, a histogram using output values acquired from the pixels corresponding to the irradiation region. The distance measurement unit 55 calculates, at step S28, the distance using the histogram.

According to the light range finding apparatus 100 of the above-described embodiment, since the positional alignment of the auxiliary optical system 32 can be performed by using the positional alignment section 33, even when the light receiving position is shifted with respect to the light receiving sensor 40 due to aging or temperature variation, the positional shift can be appropriately corrected. Hence, range finding can be performed accurately even in the case where the light range finding apparatus 100 is operated for a long period, or operated outside.

Further, according to the present embodiment, the auxiliary optical system 32 enlarges the reflected light of the pattern light PL corresponding to the irradiation region to be larger than a single pixel of the light receiving sensor 40. Therefore, respective pixels are able to effectively receive the reflected light. Accordingly, the measurement accuracy of the distance can be improved.

Moreover, according to the present embodiment, the process shown in FIG. 5 is executed, whereby a positional alignment of the auxiliary optical system 32 is performed such that the output of the light receiving sensor 40 becomes maximum. Hence, the reflected light can be effectively received by the light receiving sensor 40 so that the accuracy of the distance measurement can be improved. According to the present embodiment, the position of the auxiliary optical system 32 which is aligned by the positional alignment section 33 is stored in the non-volatile memory 51. Accordingly, by using the position value, the position of the auxiliary optical system 32 can readily be set when activating the light range finding apparatus 100.

According to the present embodiment, the process shown in FIG. 6 is executed to generate the histogram without using the output from the pixels corresponding to a portion of the reflected light of the non-irradiation region but using the output from the pixels corresponding to a portion of the reflected light of the irradiation region. Hence, S/N ratio of the histogram is improved and the accuracy of the distance measurement can be improved.

Moreover, according to the present embodiment, each light receiving element 41 included in the light receiving sensor 40 is constituted of a plurality of SPADs. Therefore, the auxiliary optical system 32 enlarges the irradiation region A1 of the pattern light PL and the positional alignment section 33 performs a positional alignment of the auxiliary optical system 32, whereby the number of SPADs which receives signal light can be maximized. Therefore, the dynamic range of the light receiving sensor 40 can be expanded.

B. Second Embodiment

The positional alignment section 33 of the light range finding apparatus 100 according to the first embodiment is capable of performing a positional alignment of the auxiliary optical system 32 in a parallel direction orthogonal to the light axis. In contrast, a positional alignment section 33B according to a second embodiment is capable of performing the positional alignment of the auxiliary optical system in a rotation direction in addition to the parallel direction. Other configurations of the light range finding apparatus 100 according to the second embodiment are the same as those in the first embodiment.

Figure 7:
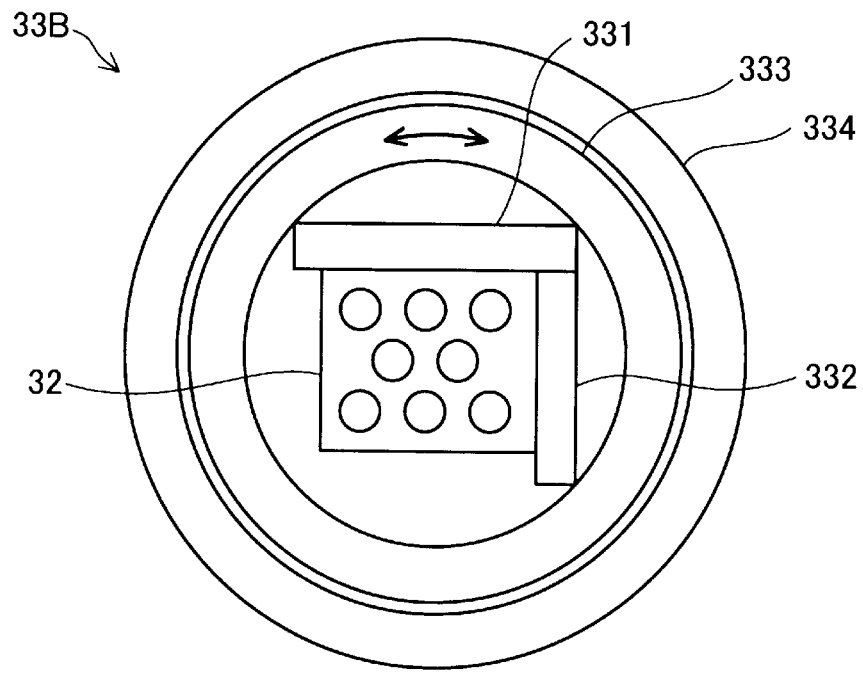
FIG. 7 is a diagram showing an overall configuration of a positional alignment section according to a second embodiment.

As shown in FIG. 7, the positional alignment section 33B according to the second embodiment is provided with a rotary movement actuator 333 in addition to the horizontally moving actuator 331 and the vertically moving actuator 332. The rotary movement actuator 333 is disposed outside the horizontally moving actuator 331 and the vertically moving actuator 332 and inside a stationary frame 334 having an annular shape. The rotary movement actuator 333 rotatory moves the auxiliary optical system 32 together with the horizontally moving actuator 331 and the vertically moving actuator 332 in the stationary frame 334, depending on the control of the control unit 50. In the process shown in FIG. 5, the control unit 50 aligns, the position of the auxiliary optical system 32 in the rotational direction other than the parallel direction such that the output of the light receiving sensor 40 becomes the maximum.

According to the above-described second embodiment, since the auxiliary optical system 32 can be moved in the rotational direction in addition to the parallel direction, the positional alignment of the auxiliary optical system 32 can be performed more accurately. Note that the positional alignment section 33 may be required to perform the positional alignment of the auxiliary optical system 32 in at least one direction between the parallel direction and the rotation direction. For example, the positional alignment may be performed in the rotational direction only. Also, the positional alignment may be performed in a direction along the light axis.

C. Third Embodiment

Figure 8:
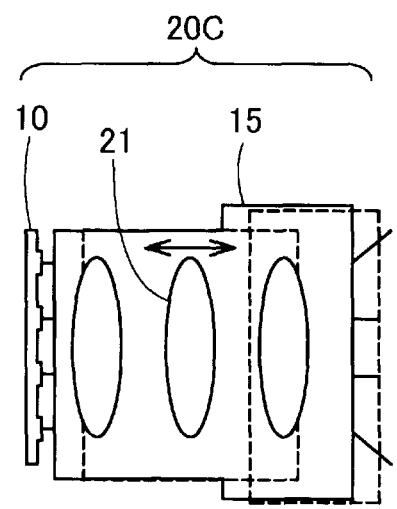
FIG. 8 is a diagram showing an overall configuration of a light emitting optical system according to a third embodiment.

As shown in FIG. 8, the light emitting optical system 20 of the light range finding apparatus 100 according to the third embodiment is provided with a varifocal lens 21. Other configurations of the light range finding lens 100 according to the third embodiment are the same as those in the first embodiment.

Figure 9:
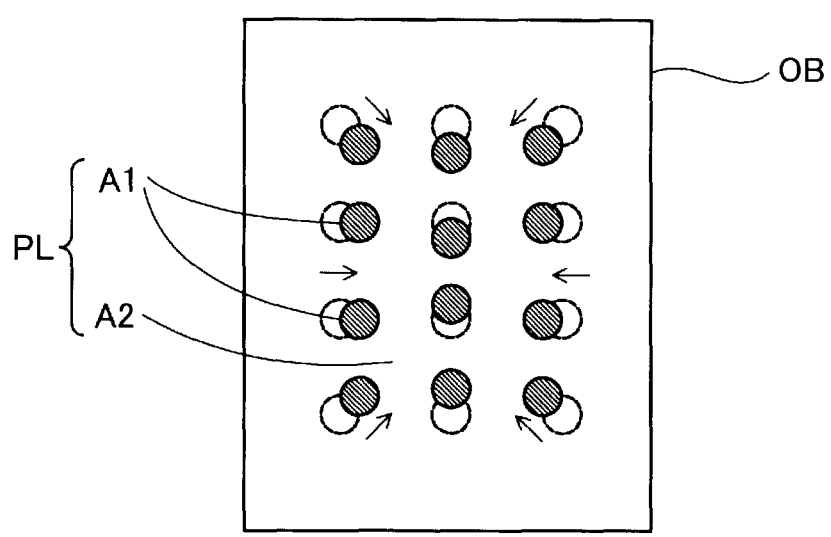
FIG. 9 is a diagram showing a state where a focal distance is being adjusted by a varifocal lens.

The varifocal lens 21 is configured to change the focal distance. For example, the varifocal lens 21 is integrated to an assembled lens which constitutes the irradiation optical system 15. The control unit 50 controls the positional alignment section 33 to align the position of the varifocal lens in the light axis direction based on the output from the light receiving sensor 40 such that the total value of the outputs from the respective pixels corresponding to the irradiation region A1 become the maximum, thereby adjusting the focal distance to the object OB with the projection pattern as shown in FIG. 9.

According to the above-described third embodiment, for example, even when the distance between the light emission circuit 10 and the irradiation optical system 15 varies because of the ambient temperature or the internal temperature, the varifocal lens 21 is moved to compensate the distance variation, whereby the focal point of the pattern light PL can be adjusted. Therefore, the accuracy of the distance measurement can be improved. Note that the configuration of the third embodiment can be arbitrarily combined with other embodiments.

D. Fourth Embodiment

Figure 10:
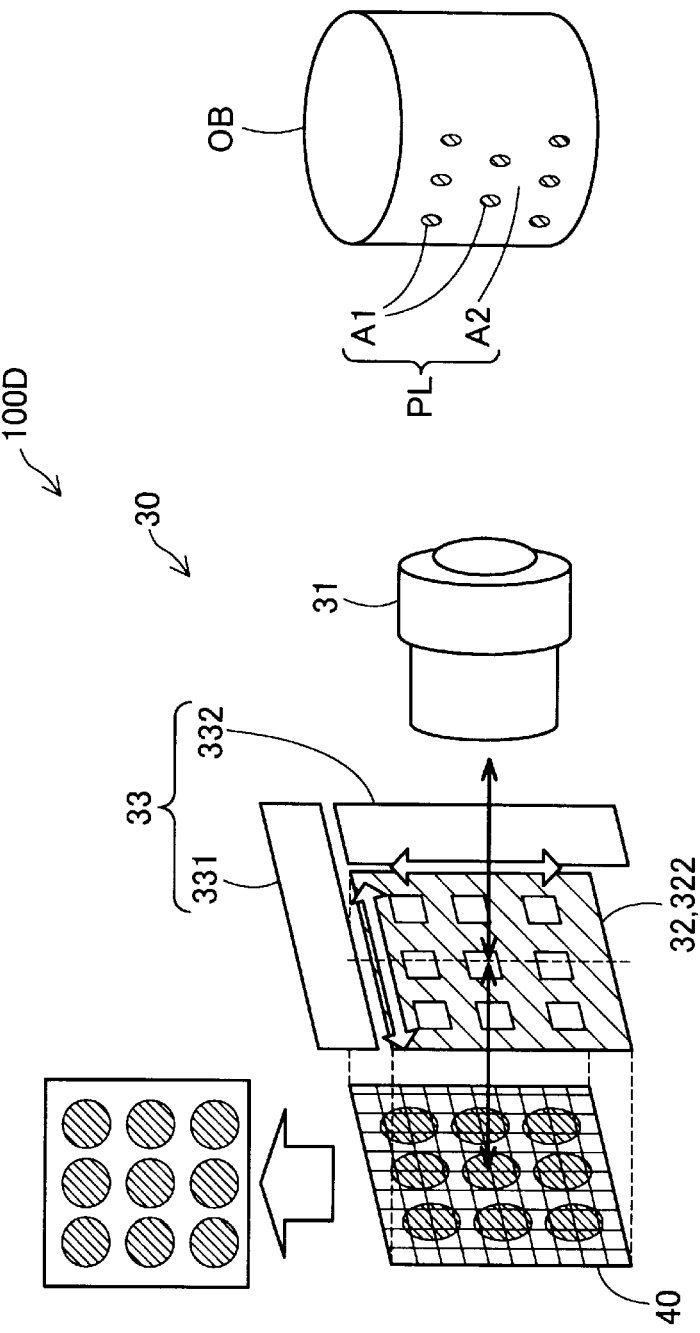
FIG. 10 is a diagram showing an overall configuration of a light receiving optical system according to a fourth embodiment.
Figure 11:
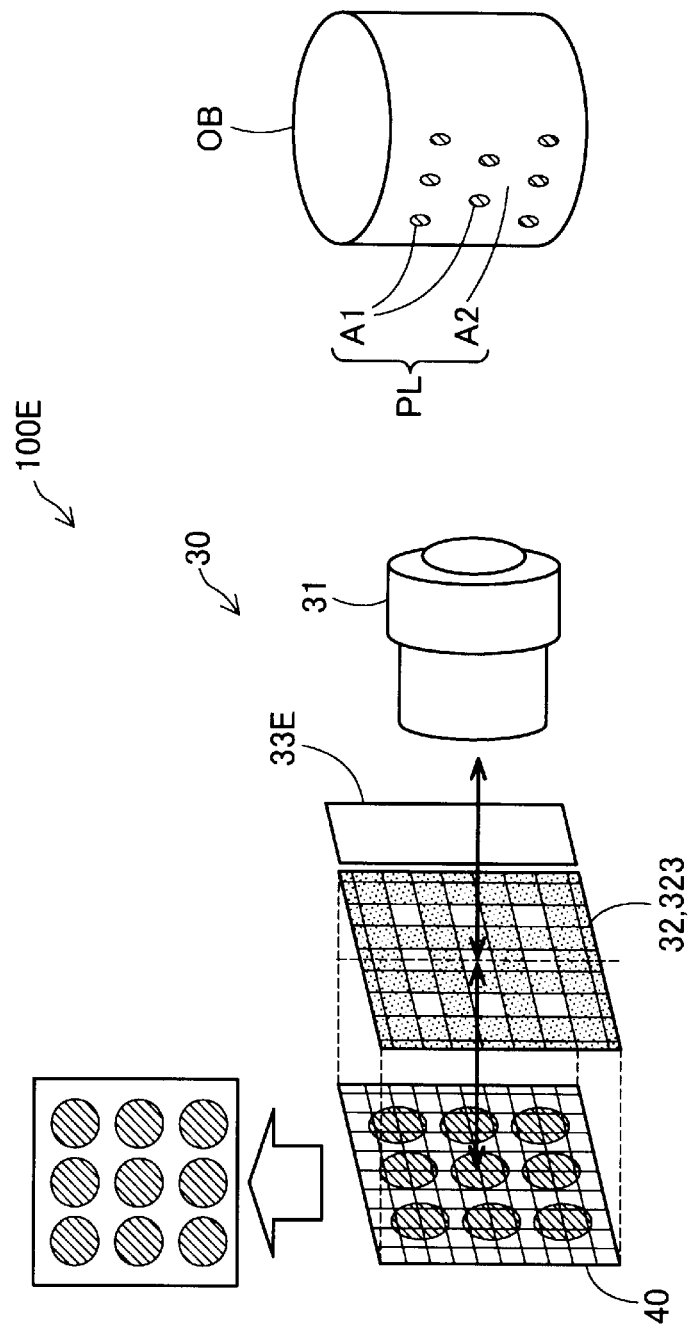
FIG. 11 is a diagram showing an overall configuration of a light receiving optical system according to a fifth embodiment.

The light range finding apparatus 100 according to the first embodiment is provided with the scaling lens 321 as the auxiliary optical system 32. A light range finding apparatus 100D according to the fourth embodiment is provided with a light shielding mask 322 as an auxiliary optical system as shown in FIG. 10. Other configurations of the light range finding apparatus 100D according to the fourth embodiment are the same as those in the first embodiment.

The light shielding mask 322 has a plurality of openings which allow the reflected light corresponding to the irradiation region to transmit therethrough and shields the reflected light corresponding to the non-irradiation region. Then, the light shielding mask 322, the light receiving lens 31 and the light receiving sensor 40 are arranged and the size of the opening of the light shielding mask is set such that the light transmitted through the light shielding mask 322 is expanded on the light receiving sensor 40 to be larger than a single pixel. For example, the light receiving sensor 40 is disposed away from the focusing distance of the light receiving lens 31, and the light shielding mask is disposed at the focusing position of the light receiving lens 31, whereby the light being incident on the light receiving sensor 40 can be expanded. Note that the shape of the opening of the light shielding mask 322 is a rectangular shape shown in FIG. 10, but may preferably be a shape as same as that of the irradiation region A1 of the pattern light PL.

The positional alignment section 33 is capable of moving, similar to the auxiliary optical system 32 according to the first embodiment or the second embodiment, the light shielding mask 322 in at least either the parallel direction or the rotational direction. The control unit 50 executes a process similar to that shown in FIG. 5, thereby performing the positional alignment of the light shielding mask 322.

Also, according to the above-described fourth embodiment, similar to the first embodiment, since the positional alignment section 33 is used to perform the positional alignment of the light shielding mask 322, even when the light receiving position with respect to the light receiving sensor 40 is shifted due to aging or temperature variation, the positional shift can be corrected. Hence, range finding can be performed accurately even in the case where the light range finding apparatus 100D is operated for a long term period, or operated outside.

E. Fifth Embodiment

The light range finding apparatus 100 according to the first embodiment is provided with the scaling lens 321 shown in FIG. 3 as the auxiliary optical system 32. In contrast, the light range finding apparatus 100E according to a fifth embodiment is provided with a liquid crystal element 323, as the auxiliary optical system 32, capable of changing the transmission position of a portion of the reflected light corresponding to the irradiation region. The liquid crystal element 323 is also referred to as a liquid crystal light valve 323. The liquid crystal element 323 includes a plurality of pixels, allowing the light to transmit therethrough or shielding the light. Similar to the fourth embodiment, the liquid crystal element 323, the light receiving lens 31 and the light receiving sensor 40 are arranged such that the light transmitted through the liquid crystal element 323 is focused as being enlarged more than a single pixel on the light receiving sensor 40, and a range of the pixels which allows the light to be transmitted through the liquid crystal element 323.

The positional alignment section 33E differs from the first embodiment and the second embodiment in that an actuator for moving the auxiliary optical system 32 is not provided. According to the present embodiment, the positional alignment section 33E is configured of a control circuit that controls the respective pixels of the liquid crystal element 323 in accordance with a command transmitted from the control unit 50 to change the transmission position of the reflected light corresponding to the irradiation region. The control unit 50 executes a process similar to the process shown in FIG. 6, thereby performing the positional alignment of the transmission position with the liquid crystal element 323.

With the fifth embodiment as described above, similar to the first embodiment, since the positional alignment section 33E is used to align the position of the light transmitted through the liquid crystal element 323, even when the light receiving position is shifted with respect to the light receiving sensor 40 due to aging or temperature variation, the positional shift can be appropriately corrected. Hence, range finding can be performed accurately even in the case where the light range finding apparatus 100E is operated for a long period, or operated outside.

F. Sixth Embodiment

Figure 12:
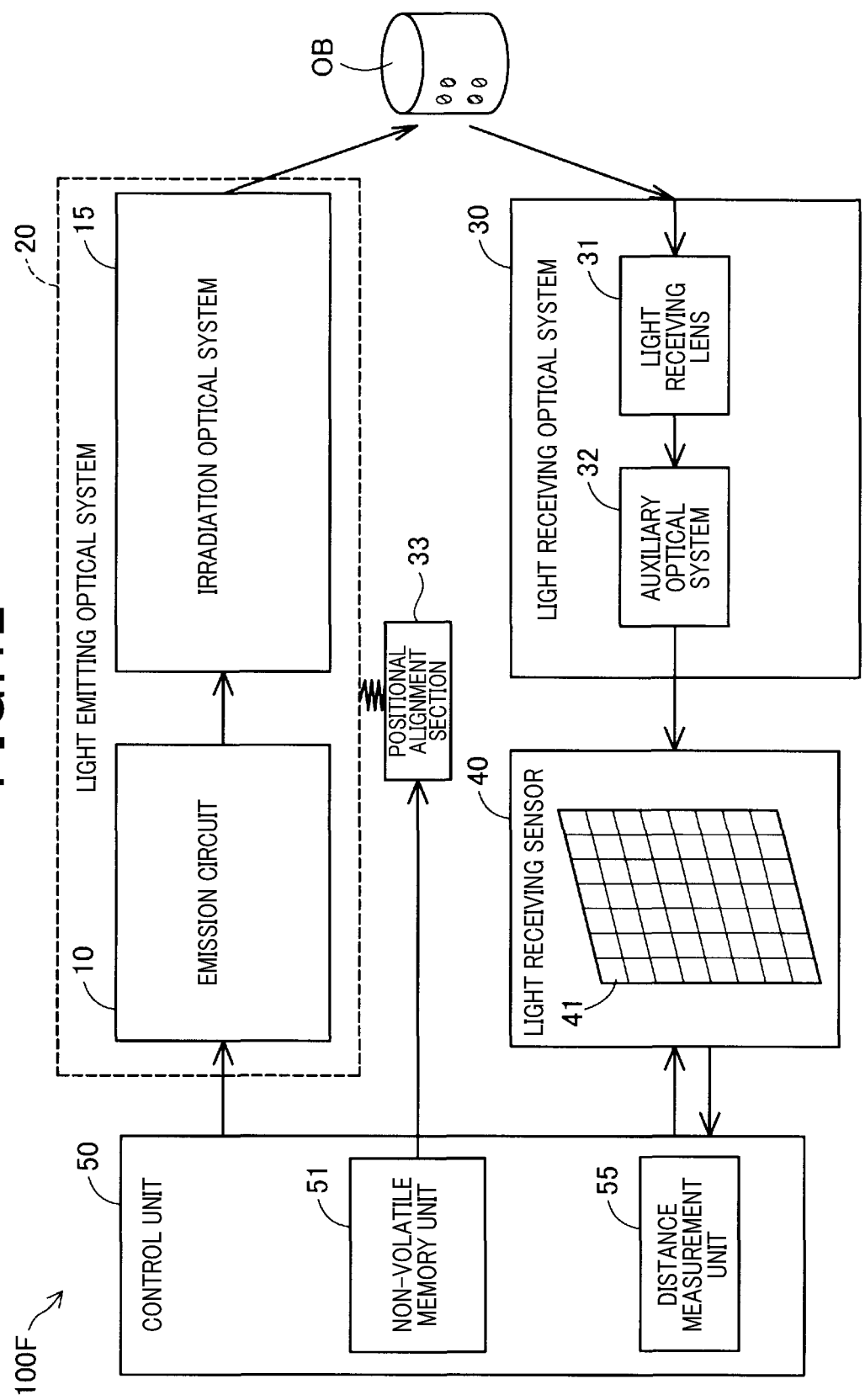
FIG. 12 is a block diagram showing an overall configuration of a light range finding apparatus according to a sixth embodiment.

The light range finding apparatus 100 according to the first embodiment aligns the position of the auxiliary optical system 32 with the position alignment section 33. In contrast, according to the light range finding apparatus 100F of the sixth embodiment, as shown in FIG. 12, the positional alignment section 33 is configured to perform a positional alignment of entire light emitting optical system 20 including the light emission circuit 10 and the irradiation optical system 15. Also, with this configuration, the light receiving position of the light receiving sensor 40 can be corrected.

G. Seventh Embodiment

Figure 13:
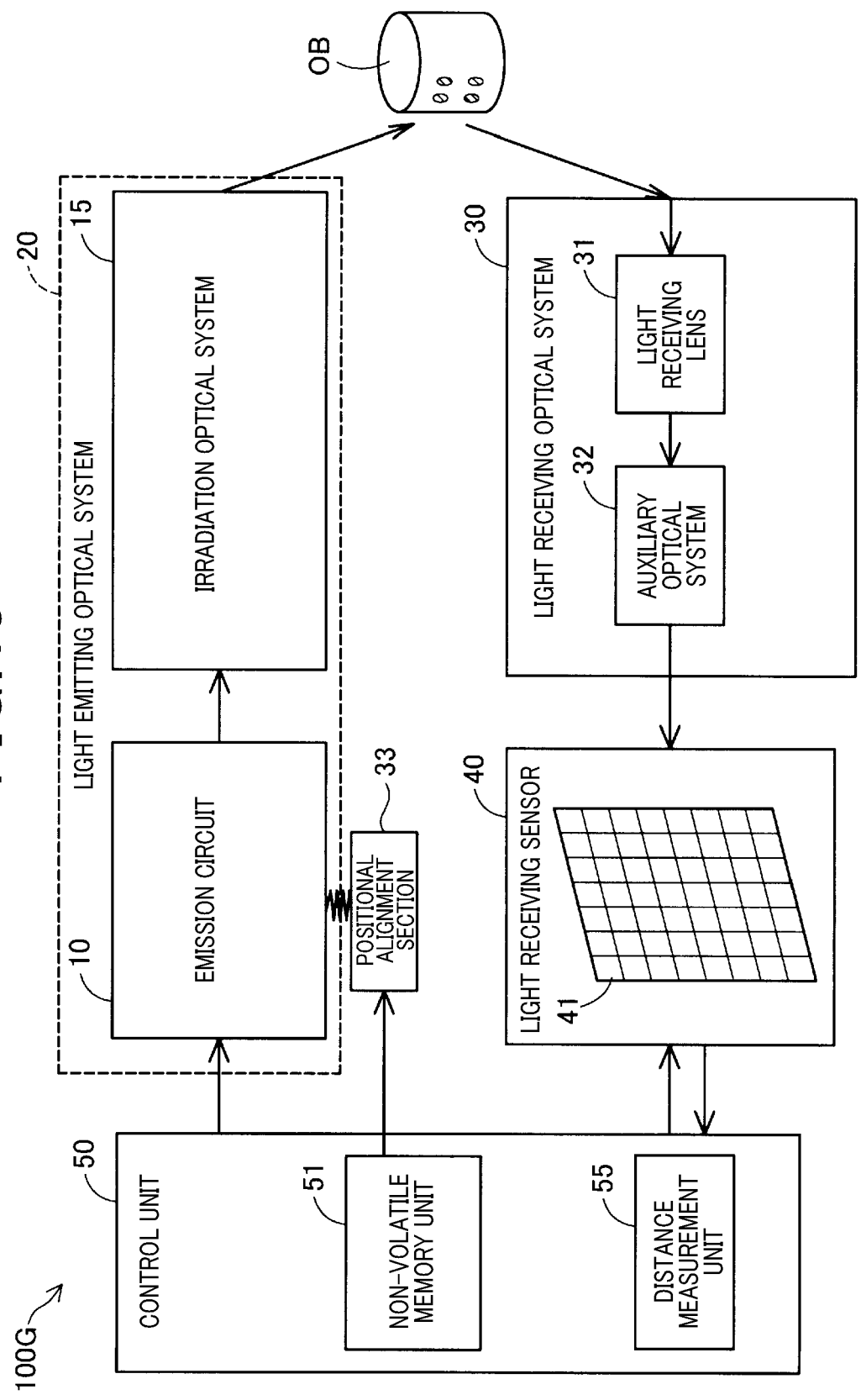
FIG. 13 is a block diagram showing an overall configuration of a light range finding apparatus according to a seventh embodiment.

The light range finding apparatus 100 according to the first embodiment aligns the position of the auxiliary optical system 32 with the position alignment section 33. In contrast, according to the light range finding apparatus 100G of the seventh embodiment, as shown in FIG. 13, the positional alignment section 33 is configured to perform a positional alignment of the light emission circuit 10 in the light emitting optical system 20, that is a positional alignment of the light source 12. Also, with this configuration, the light receiving position of the light receiving sensor 40 can be corrected. Note that the positional alignment section 33 may be configured to perform a positional alignment for the irradiation optical system 15 in the light receiving optical system 30. Moreover, the positional alignment section 33 may be configured to perform a positional alignment for the light receiving lens 31 in the light receiving optical system 30.

H. Eighth Embodiment

Figure 14:
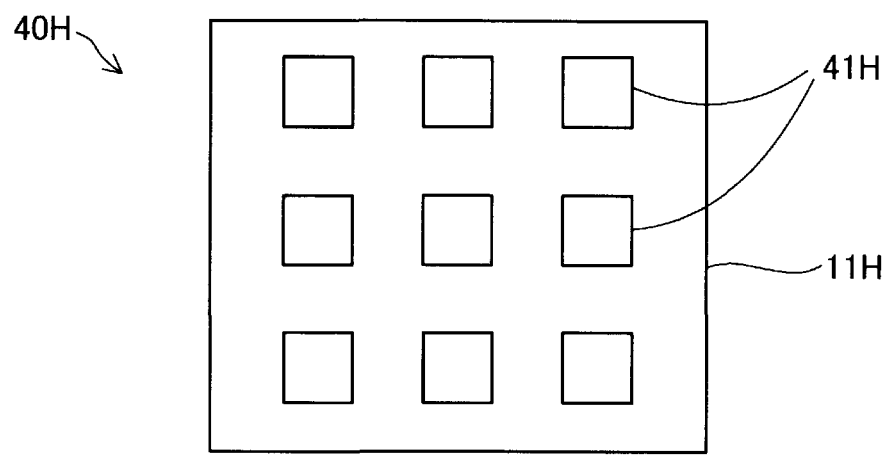
FIG. 14 is a diagram showing an overall configuration of a light receiving sensor according to an eighth embodiment.

The light range finding apparatus 100 according to the first embodiment is provided with a light receiving sensor 40 in which light receiving elements 41 are arranged in an array. In contrast, according to the eighth embodiment, as shown in FIG. 14, light receiving elements 41 are arranged on a substrate 11H, forming in an array with a predetermined interval, thereby constituting the light receiving sensor 40H. The respective light receiving elements 41G are arranged on positions corresponding to the irradiation region in the reflected light. Also, with this configuration, the light range finding apparatus 100 is able to perform a range finding.

I. Nineth Embodiment

Figure 15:
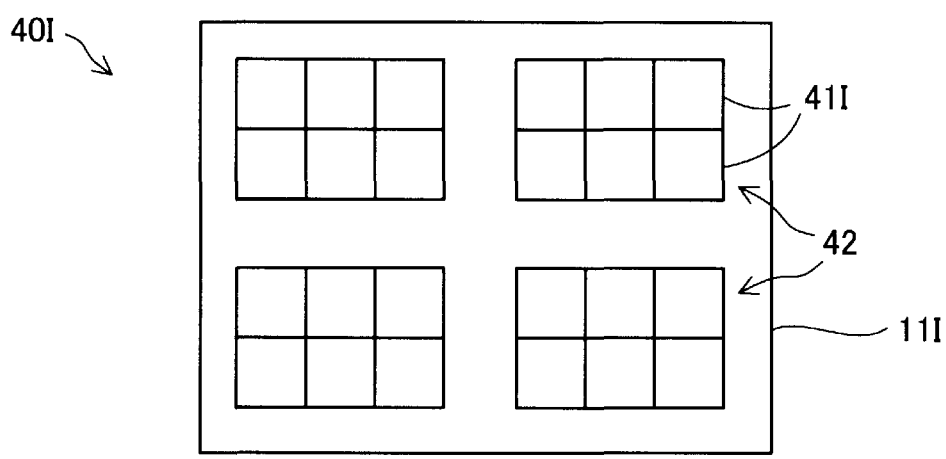
FIG. 15 is a diagram showing an overall configuration of a light receiving sensor according to a ninth embodiment.

The light range finding apparatus 100 according to the first embodiment is provided with a light receiving sensor 40 in which light receiving elements 41 are arranged in an array. In contrast, according to the ninth embodiment, as shown in FIG. 15, a plurality of light receiving ICs 42, each including a plurality of light receiving elements 41I arranged in an array, are arranged on the substrate 11I with a predetermined interval, thereby constituting the light receiving sensor 40I. The respective light receiving ICs 42 are arranged on positions corresponding to the irradiation region in the reflected light. Also, with this configuration, the light range finding apparatus 100 is able to perform range finding.

J. Other Embodiments (J-1) The above-described embodiments can be arbitrarily combined. For example, the first to fifth embodiments and the sixth embodiment (FIG. 12) or the seventh embodiment (FIG. 13) may be combined, whereby the positional alignment section 33 performs the positional alignment for both the auxiliary optical system 32 and the light emitting optical system 20.

(J-2) In the above-described embodiments, the light receiving sensor 40 is not limited to a sensor configured of the SPAD. For example, the light receiving sensor 40 may be configured of APD (Avalanche photo diode) or a PIN photo diode. Further, the light receiving sensor 40 may be configured of a phase-type imager (refer to JP-A-2016-50832) used for indirect TOF measurement method. In the case where a light receiving sensor 40 constituted of elements other than SPAD is used, the distance measurement unit 55 is not necessary to generate histogram but may acquire the distance directly from the light receiving sensor 40.

(J-3) In the above-described embodiments, the light source 12 is configured of a semiconductor laser diode. However, the light source is not limited to this, but may be configured of other light sources as long as the pattern light is capable of being projected. For example, various light sources such as a vertical cavity surface emitting laser, and a combination of the semiconductor laser and aa diffraction optical element can be utilized.

Figure 16:
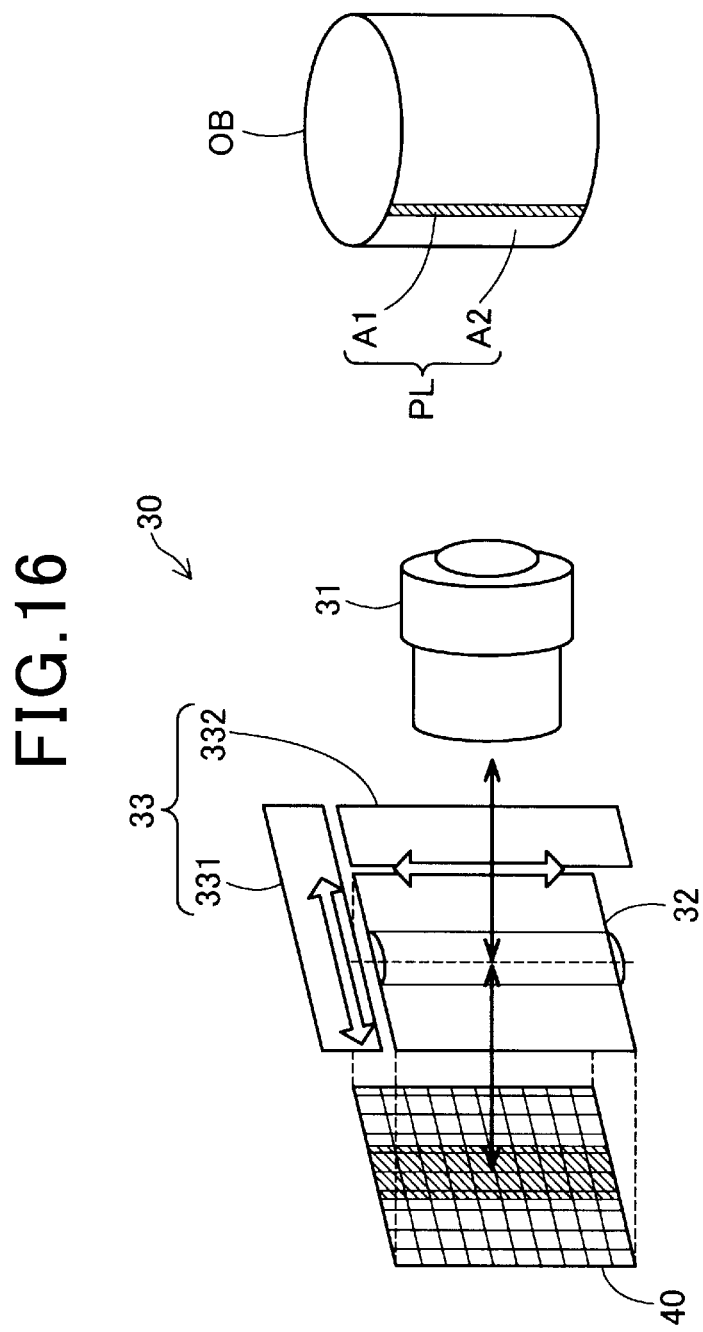
FIG. 16 is a diagram showing another example of a pattern light.

(J-4) In the above-described embodiments, the pattern light has a dotted pattern as shown in FIG. 2. However, as a space pattern of the pattern light, any patterns can be used. For example, a line-type light source may be utilized for projecting a line-shaped pattern PL as shown in FIG. 16. In FIG. 16, as a projected light pattern, a line-shaped pattern is projected and a cylindrical lens is used as the auxiliary optical system 32 to expand the irradiation region A1. Other than this, for example, a plurality of line-type light sources may be combined to project a stripe shaped or lattice shaped pattern light.

(J-5) According to the above-described embodiment, the control unit 50 controls the positional alignment section 33 to perform the positional alignment of the auxiliary optical system 32. In other words, the control unit 50 and the positional alignment section 33 are integrated to serve as a function of the positional alignment section. In this respect, the positional alignment section 33 may include a function of the control unit 50 and perform the positional alignment of the auxiliary optical system 32.

(J-6) The control unit 50 and method thereof disclosed in the present disclosure may be accomplished by a dedicated computer constituted of a processor and a memory programmed to execute one or more functions embodied by computer programs. Alternatively, the control unit 50 and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into computer readable non-transitory tangible recording media.

(J-7) The present disclosure is not limited to the above-described embodiments, but may be modified in various manners without departing from the spirit of the present disclosure. For example, the technical features in the respective embodiments may be appropriately replaced or combined in order to solve a part of the above-mentioned problems or all of the above-mentioned problems. Any of the technical features may be removed if corresponding technical features are not described as necessary elements in this specification.

CONCLUSION

According to one aspect of the present disclosure, a light range finding apparatus is provided. The light range finding apparatus is provided with a light emitting optical system that projects a pattern light having an irradiation region and a non-irradiation region; a light receiving sensor including an arrayed light receiving element; a light receiving optical system that receives a reflected light of the pattern light and enlarges a portion of the reflected light corresponding to the irradiation region to be larger than a single light receiving element and causes the enlarged reflected light to be incident on the light receiving sensor; a distance measurement unit that measures a distance to the object based on an output of the light receiving sensor; and a positional alignment section that performs, based on the output of the light receiving sensor, a positional alignment of at least a part of the light emitting optical system and the light receiving optical system.

According to the light range finding apparatus of this aspect, since the positional alignment section is used to perform the positional alignment for at least part of the light emitting optical system and the light receiving optical system, even when the light receiving position with respect to the light receiving sensor is shifted due to aging or temperature variation, the positional shift can be corrected. Hence, range finding can be performed accurately even in the case where the light range finding apparatus is operated for a long term period, or operated outside.

The present disclosure can be accomplished in various modes other than the light range finding apparatus. For example, the present disclosure can be accomplished by a light range finding method, a vehicle on which a light range finding apparatus is mounted, and a control method for controlling the light range finding apparatus.

What is claimed is:

1. A light range finding apparatus comprising:
   a light emitting optical system that projects a pattern light having an irradiation region and a non-irradiation region;
   a light receiving sensor including an arrayed light receiving element;
   a light receiving optical system that receives reflected light of the pattern light reflected at an object and enlarges a portion of the reflected light corresponding to the irradiation region to be larger than a single light receiving element and causes the enlarged reflected light to be incident on the light receiving sensor;
   a distance measurement unit that measures a distance to the object based on an output of the light receiving sensor; and
   a positional alignment section that performs, based on the output of the light receiving sensor, positional alignment of at least a part of the light emitting optical system and the light receiving optical system.

2. The light range finding apparatus according to the claim 1, wherein
   the light receiving optical system is provided with a scaling lens that enlarges a portion of the reflected light corresponding to the irradiation region and reduces a portion of the reflected light corresponding to the non-irradiation region; and
   the positional alignment section performs the positional alignment in at least one of a parallel direction of the lens and a rotation direction.

3. The light range finding apparatus according to the claim 1, wherein
   the light receiving optical system includes a light shielding mask that allows a portion of the reflected light corresponding to the irradiation region to transmit therethrough and shields a portion of the reflected light corresponding to the non-irradiation region; and
   the positional alignment section performs the positional alignment in at least one of a parallel direction of the light shielding mask and a rotation direction.

4. The light range finding apparatus according to the claim 1, wherein
   the light receiving optical system includes a liquid crystal element capable of changing a transmission position of a portion of the reflected light corresponding to the irradiation region; and
   the positional alignment section controls the liquid crystal element to perform the positional alignment of the transmission position.

5. The light range finding apparatus according to claim 1, wherein
   the light emitting optical system includes a varifocal lens; and
   the positional alignment section adjusts a focal distance of the varifocal lens based on the output from the light receiving sensor.

6. The light range finding apparatus according to claim 1, wherein
   the positional alignment section performs the position alignment such that the output of the light receiving sensor becomes maximum.

7. The light range finding apparatus according to claim 1 further comprising a non-volatile memory unit in which adjusted positions are stored; and
   the positional alignment section performs a positional alignment based on the adjusted positions stored in the non-volatile memory unit, when activating the light range finding apparatus.

8. The light range finding apparatus according to claim 1, wherein
   the light receiving sensor has a plurality of pixels each including a plurality of single photon Avalanche diodes; and
   the distance measurement unit generates a histogram in which the output is stored for each time of flight without using the output from the pixels corresponding to a portion of the reflected light of the non-irradiation region but using the output from the pixels corresponding to a portion of the reflected light of the irradiation region, and measures the distance based on a position of a peak in the histogram.

* * * * *